July 4, 1961   E. A. THOMPSON   2,990,954
AIR GAGE

Filed April 22, 1957   3 Sheets-Sheet 1

INVENTOR.
EARL A. THOMPSON
BY
ATTORNEYS.

July 4, 1961 E. A. THOMPSON 2,990,954
AIR GAGE
Filed April 22, 1957 3 Sheets-Sheet 2

INVENTOR.
EARL A. THOMPSON
BY
ATTORNEYS

July 4, 1961 E. A. THOMPSON 2,990,954
AIR GAGE

Filed April 22, 1957 3 Sheets-Sheet 3

INVENTOR.
EARL A. THOMPSON
BY
*Berner, Kindle, Laughlin & Reich*
ATTORNEYS

United States Patent Office 2,990,954
Patented July 4, 1961

2,990,954
AIR GAGE
Earl A. Thompson, Ferndale, Mich.
(1300 Hilton Road, Ferndale Station, Detroit 20, Mich.)
Filed Apr. 22, 1957, Ser. No. 654,093
5 Claims. (Cl. 209—82)

This invention relates to gaging devices for measuring and sorting machined parts in accordance with their dimensions. Present day methods of machining parts in high production, particularly with automation, require the use of automatic gaging and sorting equipment to control the accuracy of the output of the production machines. A number of types of automatic inspection equipment are available to meet this requirement. Where a high degree of accuracy and precision is required, the complexity and resultant high cost of automatic gaging equipment of requisite precision is a problem.

In the inspection of parts by hand methods, one of the most reliable and highly accurate types of equipment is that which utilizes air under pressure and wherein an orifice is formed between the gaging head and the surface of the work piece to be measured, the size of which gives a variation in pressure reading which can be translated into dimensional terms to very close limits. Equipment of this type has been found extremely reliable and has a long life with low maintenance cost but has heretofore not been readily usable in automatic sorting equipment without the addition of excessively complex conversion and translation devices for the purpose of adapting it to such equipment.

It is an object of the present invention to provide an improved form of automatic gaging and sorting equipment which may utilize a standard air type gaging head.

Another object of the present invention is to provide an automatic gaging device of this character wherein a high degree of precision and accuracy may be obtained reliably and at low cost.

It is an object of the present invention also to provide a device which will sort successively produced parts into batches according to their dimensions with extremely small size increments from batch to batch.

Further objects and advantages of the present invention will be apparent from the following description, reference being had to the accompanying drawing wherein a preferred form of the present invention is illustrated.

According to the present invention, a gaging head of conventional form may be correlated to the shape and size of the work pieces being produced so that it forms a gaging orifice through which air can exhaust to the atmosphere. This orifice may be supplied with air from a source of supply at a constant regulated pressure. Intermediate the source and the gaging orifice there may be provided a metering orifice so that the air pressure will drop to atmospheric in two steps: first, through the metering orifice at an intermediate value of pressure, and then through the gaging orifice to atmospheric. The value of the intermediate pressure will, of course, vary depending upon the relative size of the metering and gaging orifices.

Means in the form of a mercury column manometer may be provided for detecting the intermediate pressure and thus the size of the work piece. These variations may be detected by the use of a series of spaced electric contacts in the wall of the manometer column which may be utilized to selectively control an electrically operated sorting tray. For the purpose of eliminating the effect of variations in air supply pressure, another mercury column manometer may be utilized to actuate a regulator valve. Means may also be provided for adjusting the manometers in accordance with barometric pressure for accurately calibrating the device relative to other similar devices.

Figure 1:
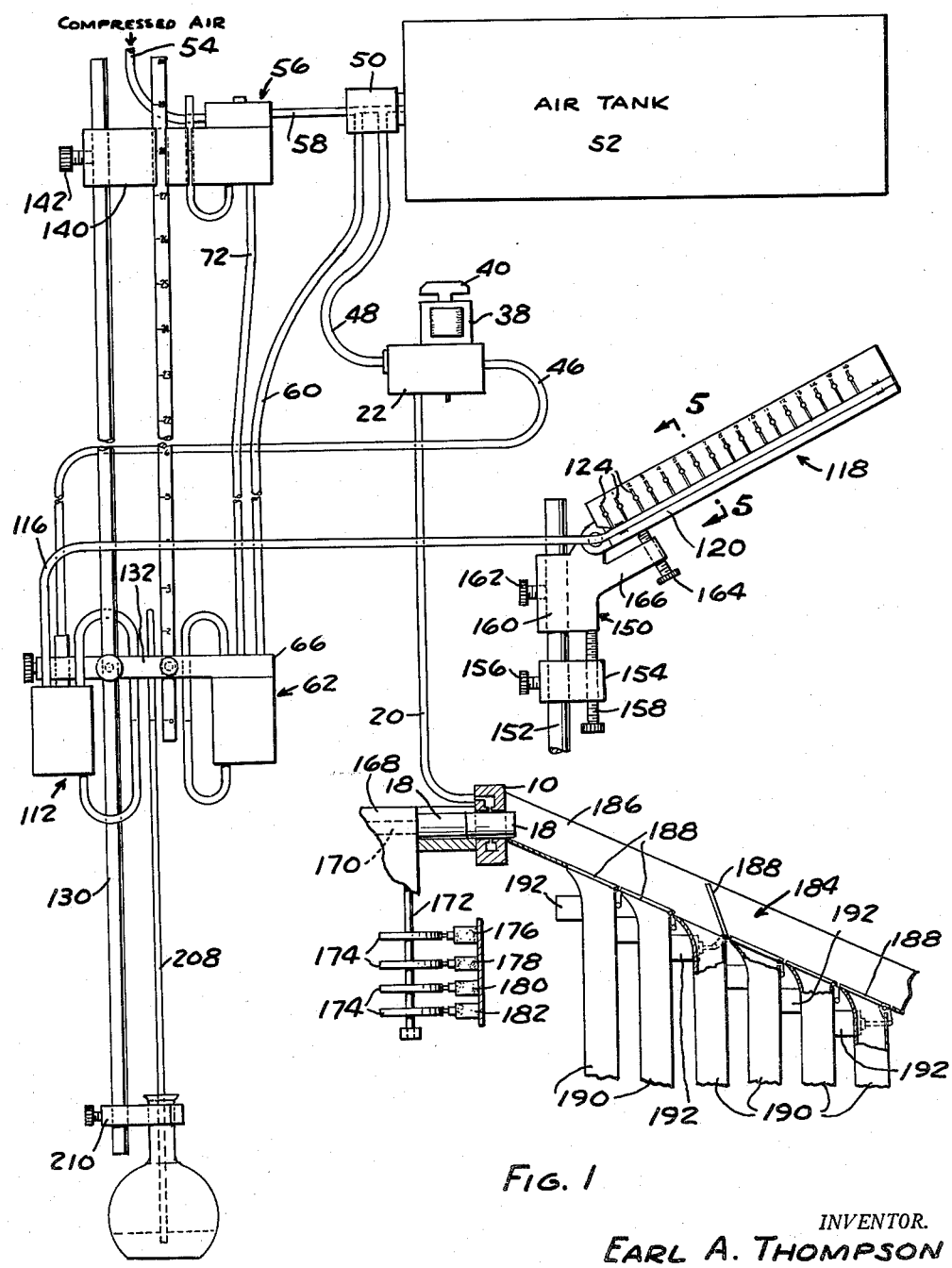
FIG. 1 is a diagrammatic view showing an air operated gaging and sorting device embodying a preferred form of the present invention.
Figure 6:
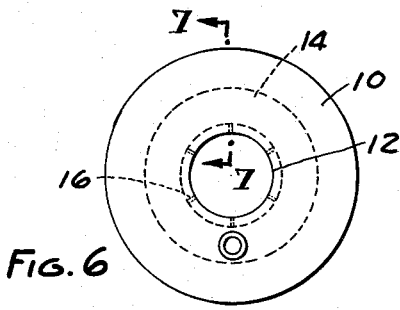
FIG. 6 is an end view of the gaging head.
Figure 7:
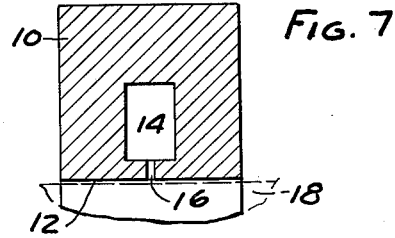
FIG. 7 is a cross sectional view on line 7—7 of FIG. 6.

Referring now to the drawing, there is illustrated in FIG. 1 a gaging head 10 which is of the type for gaging the external diameter of a cylindrical part such, for example, as an automotive valve tappet, wrist pin or the like. This gaging head may be of any suitable form, the particular one here disclosed being illustrated in FIG. 6 an an annulus having an accurately sized internal bore 12. A circular manifold passage 14, FIG. 7, has a plurality of feed passages 16 opening into the bore 12 to supply air to the orifice which is formed by the clearance space between a work piece 18 and the bore 12.

Figure 4:
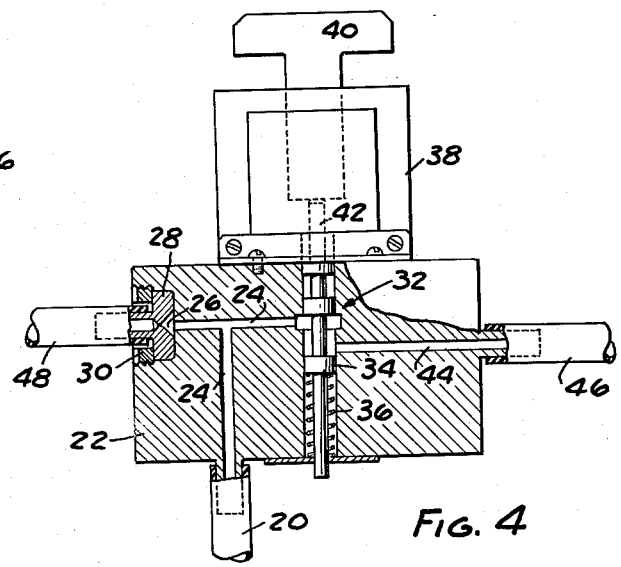
FIG. 4 is a detailed sectional view showing the solenoid valve and junction block of FIG. 1.

The gage head 10 is supplied by a conduit 20 which connects between the manifold 14 and a junction block 22. The block 22, which is shown in section in FIG. 4, contains an internal T-shaped passage 24 which serves to connect conduit 20 with a metering orifice 26 formed in a fitting 28 which is attached to the junction block by a nut 30. A valve 32, which is also connected with passage 24, has a sliding spool 34 which is biased upwardly by a spring 36.

An actuating solenoid 38 having an armature 40 is mounted on top of the block 22 and, when energized, pulls the armature 40 down against the stem 42 of the valve 34, whereby the latter blocks communication between passage 24 and a passage 44. The passage 44 connects to a conduit 46 leading to a size-detecting manometer later to be described.

Connected to the orifice fitting 28 is a conduit 48 which connects to a manifold fitting 50 communicating with the interior of an air tank 52. The latter forms a source of air under a uniformly regulated pressure. The air tank 52 receives its air from a supply pipe 54 which is connected to any suitable compressed air source maintained at some pressure above that which it is desired to maintain in the tank 52.

Conduit 54 leads to a regulator valve 56 from which a conduit 58 leads to the interior of the tank 52 through the manifold block 50. A pressure sampling conduit 60 connects between the manifold 50 and the mercury cup of a manometer 62 which is shown more clearly in FIG. 3.

Figure 3:
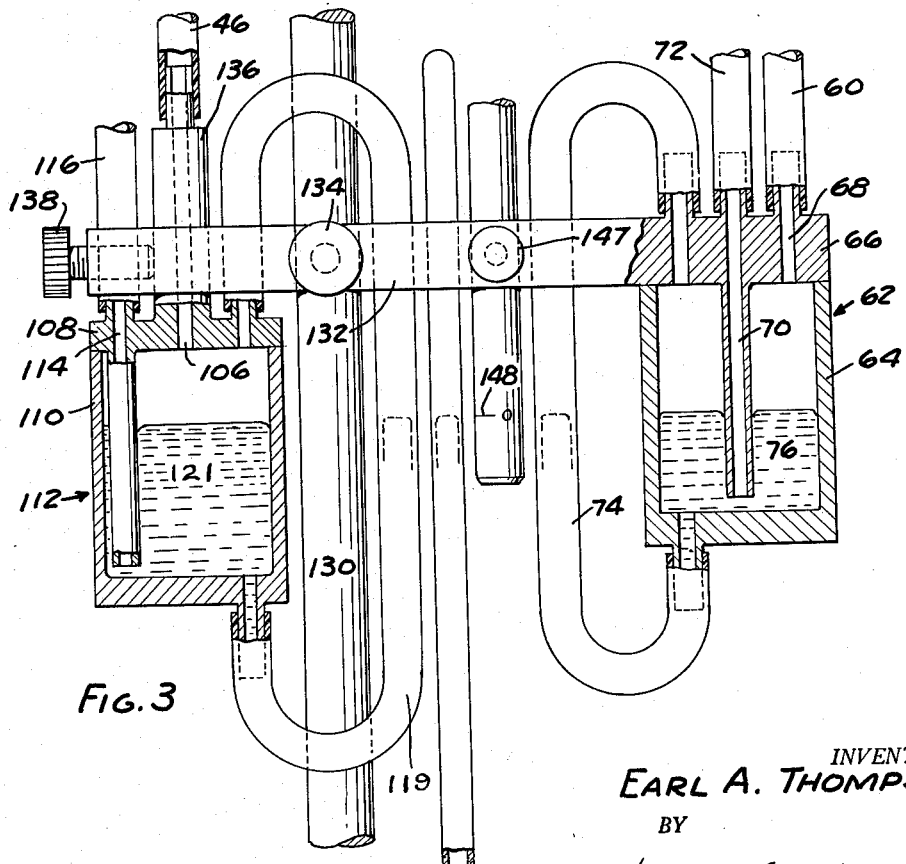
FIG. 3 is a fragmentary view partly in section showing a portion of the mechanism of FIG. 1.

The manometer 62 comprises a cylindrical chamber or cup 64, the cover 66 of which has a conduit 68 connected with conduit 60. The cover 66 also has a conduit 70 which extends to a point near the bottom of the cup 64 and which connects at its upper end with a conduit 72 leading to the regulator valve 56. For the purpose of conveniently and visibly indicating the level of liquid within the cup 64, a C-shaped conduit 74 of transparent material forms a closed loop with the top and bottom of cup 64 as shown in FIG. 3. The cup 64 and the conduit 70—72 are charged with a body of mercury 76 to form a manometer.

The regulator valve 56 comprises a mercury cup 78 having a passage 80 in its bottom which connects with the conduit 72. Within the cup 78 is a float 82 for the purpose of actuating the regulating valve. The cup 78 is vented by a passage 84 and has a U-shaped sight tube 86 connected to the bottom of the cup by a passage 88 for observing the mercury level in the cup. The upper end of U-tube 86 is vented to atmosphere.

Formed in the cover 90 of the cup 78 is a valve bore 92 within which is slideably mounted a valve spool 94 having its stem 96 in abutment with the central wall 98 of the float 82. Three internal passages intersect the bore 92, passage 100 connecting with the inlet air conduit 54, passage 102 connecting with conduit 58 and passage 104 opening to atmosphere. Spool 94 when in its central position as illustrated, blocks all communication between these conduits. When the spool 94 is lowered, inlet air is admitted from conduit 100 to conduit 102. When the spool 94 is raised, conduit 102 is connected to exhaust conduit 104.

Conduit 46 connects to a passage 106 formed in the cover 108 of another mercury cup 110. These constitute a second manometer, generally designated 112. The cover 108 also contains a passage 114 extending to near the bottom of the cup 110 and communicating with a conduit 116 leading to a pressure reading device generally designated 118, FIG. 1. The cup 110 is also provided with a C-shaped sight tube 119 for reading the level of mercury in the cup 110 and which communicates with the top and bottom of the cup. The charge of mercury 121 contained within the cup 110 and the column formed by passages 114 and 116 will form a manometer which is responsive to the intermediate pressure between the orifice 28 and the gaging orifice at head 10.

Figure 5:
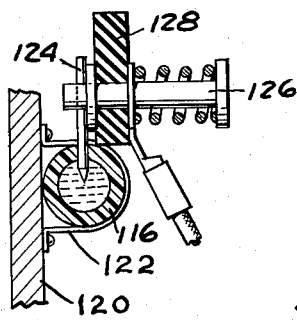
FIG. 5 is a cross section in line 5—5 of FIG. 1.

The gaging or pressure reading device 118 may comprise an extension of the conduit 116, the latter being flexible and formed of insulating material in the form illustrated. The reading device thus may comprise the upper end of the conduit 116 which is inclined and attached to a bracket 120 as by straps 122, FIG. 5. Tightly sealed in the side wall of the conduit 116 are a plurality of electrical contacts 124 having terminals 126 mounted upon a terminal block 128 of insulating material. The upper end of the conduit 116 is open to atmosphere.

The parts heretofore described may be mounted as shown in FIG. 1 wherein a stationary vertical rod 130 may be secured to a suitable support, not illustrated, and forms a base for the manometers and other equipment. The mercury cups of the manometers 62 and 112 may be secured to the rod 130 by means of the extension bracket 132 which may be formed integrally with the cover 66.

The rod 130 passes through a hole in the bracket 132 and the latter is rigidly secured thereto as by a set screw 134. The cup of manometer 112 is adjustably secured to the bracket 132 by means of the upwardly extending stud 136 which passes through a hole in bracket 132 and is secured thereto in any desired position by means of a thumb screw 138.

The regulator valve 56 is secured to the rod 130 by means of the extension 140 which may be formed integrally with the cup 78 and have a hole to receive rod 130 and a thumb screw 142 whereby the bracket may be secured to rod 130 in any desired position of vertical adjustment. The bracket 140 has a key hole slot 144 for the reception of a measuring rod 146. The latter is secured in the lower bracket 132 in an adjustable position by means of a set screw 147. The rod 146 carries a datum index 148 at its lower end which may be aligned with the mercury level in the various sight tubes. At its upper end the rod 146 carries a scale which may be calibrated and read in connection with the mercury height in the sight tube 8.

The air tank 52 and junction block 22 may be mounted upon any suitable support not illustrated, while the pressure reading device 118 may be mounted upon a precision adjustment bracket 150. For this purpose, a stationary vertical rod 152 is mounted rigidly on a suitable support not shown and carries a block 154 secured thereto by set screw 156 and having a micrometer screw 158 mounted therein. Above the block 154 is a second block 160 secured to the rod 152 by a set screw 162. The block 160 rests against the end of micrometer screw 158 and has pivoted thereto the arm 120. A micrometer adjusting screw 164 mounted in an arm 166 serves to adjustably position the bar 120 at the various angles to the vertical.

The gaging head 10 is associated with that portion of the production machine where the finished parts are cyclically ejected seriatim. This ejector mechanism is indicated diagrammatically at 168 wherein an ejector plunger 170 serves to push finished work pieces one at a time into and through the bore of the gage head 10. Connected to a suitable rotating part of the machine so as to rotate in synchronism with the ejection cycles, is a cam shaft 172. The latter has a plurality of cams 174 which serve to actuate a series of four switches 176, 178, 180 and 182.

The switches serve the purpose of controlling the part sorting mechanism as well as the solenoid valve in junction block 22. The sorting tray is indicated generally at 184 and may comprise a chute 186 down which the parts slide by gravity after leaving the gage block 10. The chute includes a plurality of sorting gates 188 which in their normal position form the bottom of chute 186 and also close the entrance opening to a corresponding series of batch delivery chutes 190. When one of the gates 188 is swung upwardly, a part sliding down the chute 186 will fall into the corresponding open batch chute 190. A series of solenoids 192 are provided for actuating the sorting gates 188.

Figure 8:
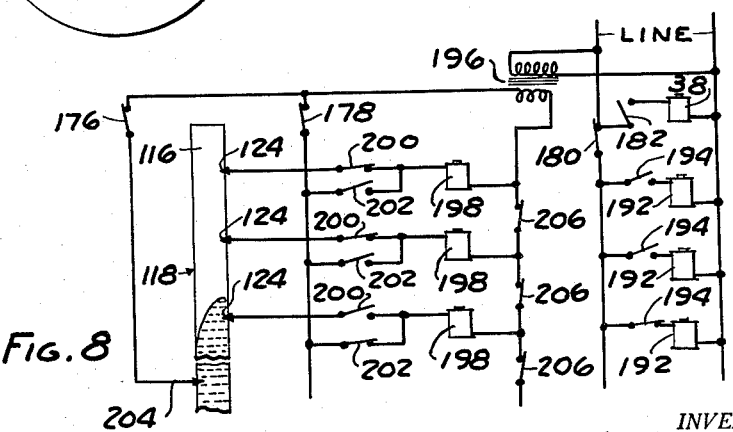
FIG. 8 is a circuit diagram of the mechanism shown in FIG. 1.

Referring now to the circuit diagram of FIG. 8, the solenoid 38 of valve 32 is connected directly across the line under the sole control of cam operated switch 182. The gate operating solenoids 192 are individually connected across the line under the control of individual relay contactors 194 and under the master control of cam operated switch 180.

A low voltage supply transformer 196 is connected across the line for supplying the coils of the relays which operate contactors 194. These operating coils are indicated at 198. Each relay coil 198 in addition to controlling the main contactor 194 which is normally open, has in addition a normally closed control contactor 200 and a normally open holding contactor 202, these being of the make-before-break type.

Each of the relays 198 may be initially energized through the circuit which includes the cam operated switch 176 as a master control and the pressure reading unit 118 as an individual control. The latter is provided with a common terminal pin 204 in series with cam switch 176. Each of the relays 198 except the uppermost one in FIG. 8 is under the control of a dominating contactor 206 which is normally closed and is opened by the relay 198 immediately above it. The holding contactors 202 of the entire set of relays 198 are connected through the cam operated switch 178 which acts as a master cut-off switch.

If it is desired to adjust the manometers 62 and 112 in relation to variations in atmospheric pressure, a simple barometric mercury column indicated at 208 may be provided and secured to the rod 130 by a bracket 210. The barometric column is positioned adjacent to the datum mark of the measuring bar 146 for ready coordination therewith.

Figure 2:
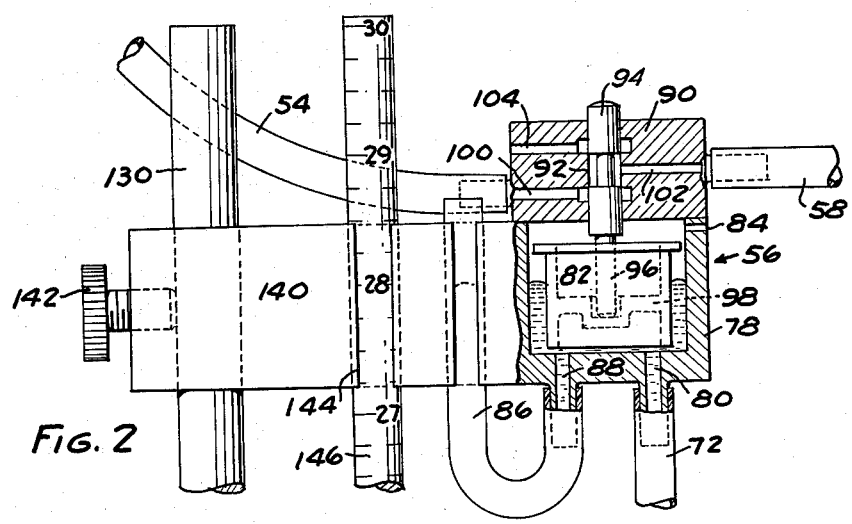
FIG. 2 is a fragmentary view partly in section showing a portion of the air pressure regulating mechanism.

In operation, the parts are shown in the drawing in the position they would occupy at the instant that a gage reading has been taken and the sorting tray energized for reception of a part that is about to be ejected from the gaging head. As a preliminary to this, the adjustable parts of the manometer and regulator are set in coordination with one another and with the barometer column 208 as illustrated in FIGS. 2 and 3. The scale reading on measuring bar 146 may be chosen to indicate the value of the regulated pressure above atmosphere which is to be maintained in tank 52, in this case at 28 inches.

When the supply of compressed air is first turned on through pipe 54, the float 82 of manometer 62 will lower the valve 94 permitting the air to flow into tank 52 until the pressure therein reaches the desired 28 inches of mercury. At that point, the float 82 will rise due to the tank pressure being transmitted to the manometer 62 through the sampling conduit 60. At this point, the valve 94 will centralize. Should there be any rise in pressure in tank 52 above the desired value, as for example due to temperature expansion, float 82 will rise higher and open valve 94 to exhaust conduit 104 until pressure has fallen to the desired value.

While the size of the part 18 is being gaged in the head 10, the cam switch 182 which controls solenoid valve 32 is open; thus de-energizing solenoid 38 and permitting valve 32 to stay open under the urge of its spring 36. The air from tank 52 flows to the junction block 22 through conduit 48 and in passing through the orifice 26 undergoes a certain pressure drop down to an intermediate pressure in the T-shaped passage 24. From here it flows through conduit 20 to the gaging head 10 where it escapes through the orifice formed by the clearance between the work piece 18 and the bore 12, undergoing in this process a further pressure drop to atmospheric level.

Since the intermediate pressure in passage 24 varies with the size of the gaging orifice, the reading of this pressure, which is taken by the manometer 112 and pressure reading device 118, is a measure of the size of the work piece 18 relative to the size of the bore 12 in the gaging head. This intermediate pressure is transmitted through conduit 46 to the manometer 112 and the level of the mercury in the pressure reading head 118 will vary with that pressure. As shown in the drawing, the pressure is relatively high and the mercury column is in contact with the third last contact 124. This means that the particular work piece 18 is one which is near the upper limit of the particular size range for which the device is designed and adjusted.

Referring now to FIG. 8, the cam operated switch 182 is in its open position, thus de-energizing solenoid 38 of valve 32 as previously explained. The other cam operated switches 176, 178 and 180 are in their closed positions. The mercury column is in contact with the third last contact 124 and this in conjunction with cam operated switch 176, contact 204, initiating contact 200 (which was closed) and dominating contactors 206 served to initially energize the coil of relay 198. Thereupon, the holding contact 202 was closed and momentarily thereafter contactors 200 and 206 were opened. As illustrated in FIG. 8, the relay 198 in question is energized and under the control of its holding contactor 202, the cam switch 178, and the two dominating switches 206 of the relays immediately above it.

The relays which would be immediately below the one in question are disabled by the opening of the dominating switch 206, shown at the bottom of Fig. 8. The energization of relay 198 also closed the corresponding contactor 194 to energize the gate actuating solenoid 192 to open the corresponding gate 188 as shown in Fig. 1.

As the cam shaft 172 continues to drive the cams 174, cam switch 176 is opened, thus disabling all the initiating circuits for the relays 198. At the same time or shortly thereafter, cam switch 182 closes to energize solenoid 38 and close air valve 32, thus trapping the air in conduit 46 and holding the manometer 112 and pressure reading device 118 stabilized.

Thereafter, the ejector mechanism 168 pushes another piece into the gaging head 10 forcing the piece that was formerly there to fall into the chute 186 and by means of the open gate 188 to fall into the corresponding batch chute 190. Thereupon, the cam switch 182 is again opened to open air valve 32 and the new part which is now in the gaging head 10 is gaged and the mercury in the reading device finds a new level corresponding to the size of the new piece. Because cam operated switch 176 is opened at this time, no action takes place as a result.

Next, the cam operated switch 178 opens, which breaks the holding circuit for relays 198 thus insuring that all of them are now de-energized. This in turn de-energizes the corresponding gate solenoid 192 and all gates are closed. Thereupon, the cam switch 178 again closes and momentarily thereafter, the cam switch 176 closes. This re-establishes an initiating circuit for all of the relays 198 below the uppermost contact pin 124 which is contacted by the mercury column at its new level and another cycle is ready to proceed in the same manner previously described and for the purpose of opening the proper gate 188 which corresponds to the size reading of the new piece in the gage head. It will be seen that these cycles can go on repeatedly as the production machine feeds finished work pieces to the gaging head. It will be seen that the device provides a very high degree of accuracy because of the precision control of the regulated air pressure and its coordination with atmospheric pressure. Through the use of the highly sensitive mercury column manometer, small differences in pressure are accurately measured by the pressure reading head 118 and the reading there is made independent of atmospheric pressure variations.

The device is, moreover, readily adjustable to coordinate the level of the readings taken with the size of a master gage or part in order to hold the sorted lots to within any desired upper and lower tolerance limits. Thus, the reading at head 118 may be adjusted relative to the absolute size of the master gage by raising and lowering the block 160 upon the mounting rod 152 and this may be done with high accuracy through the use of micrometer screw 158. The amount of tolerance which is desired between the maximum and minimum size batches, or in other words the step width from batch to batch, may be adjusted by changing the angle of inclination of the reading head 118 through the medium of adjusting screw 164. If wider steps are desired, the head is inclined more nearly to the vertical and if narrower steps are desired, the head is brought down closer to horizontal.

While the form of embodiment of the invention as herein disclosed constitutes a preferred form, it is to be understood that other forms might be adopted, all coming within the scope of the claims which follow.

What is claimed is as follows:

1. An automatic work piece size selector comprising a gaging head having a port adapted to form with the work piece a gaging orifice the size of which depends upon the size of the work piece, means including a source of air at regulated pressure and a metering orifice for supplying air through the gaging orifice towards the work piece, a mercury column manometer connected to respond to the pressure intermediate the two orifices, a plurality of contacts positioned along the range of travel of the mercury meniscus in the manometer for successive electric contact therewith in accordance with meniscus height, a sorting mechanism having electrically controlled work discharging mechanism connected by a circuit with said contacts for selectively directing work pieces into various paths in accordance with their size, a shut-off valve between the air supply and the manometer, means for passing work pieces first into the gaging head and then into the sorting mechanism and means for opening the shut-off valve in sequence to passes of a work piece.

2. An automatic gaging and sorting device comprising a gaging head having a port adapted to form with a work piece a gaging orifice the size of which depends upon the size of the work piece, means including a source of air at regulated pressure and a metering orifice for supplying air through the gaging orifice towards the work piece, a mercury column manometer connected to respond to pressure intermediate the two orifices, a plurality of contacts positioned along the range of travel of the mercury meniscus in the manometer for successive electric contact therewith in accordance with meniscus height, a work piece transfer and sorting mechanism having electrically controlled work discharging mechanism connected by a circuit with said contacts for selectively directing successive work pieces into various paths in accordance with their size, and sequentially controlled valve means for isolating the manometer from the air supply and the gaging head during transfer of a work piece.

3. An automatic gaging and sorting device comprising a gaging head having a port adapted to form with a work piece a gaging orifice the size of which depends upon the size of the work piece, means including a source of air at regulated pressure and a metering orifice for supplying air through the gaging orifice towards the work piece, a mercury column manometer connected to respond to pressure intermediate the two orifices, a plurality of contacts positioned along the range of travel of the mercury meniscus in the manometer for successive electric contact therewith in accordance with meniscus height, a work piece transfer and sorting mechanism having electrically controlled work discharging mechanism connected by a circuit with said contacts for selectively directing successive work pieces into various paths in accordance with their size, and means operated electrically for isolating the manometer during transfer of a work piece.

4. An automatic gaging and sorting device comprising a gaging head having a port adapted to form with a work piece a gaging orifice the size of which depends upon the size of the work piece, means including a source of air at regulated pressure and a metering orifice for supplying air through the gaging orifice towards the work piece, a mercury column manometer connected to respond to pressure intermediate the two orifices, a plurality of contacts positioned along the range of travel of the mercury meniscus in the manometer for successive electric contact therewith in accordance with meniscus height, a work piece transfer and sorting mechanism having electrically controlled work discharging mechanism connected by a circuit with said contacts for selectively directing successive work pieces into various paths in accordance with their size, sequentially controlled valve means for isolating the manometer from the air supply and the gaging head during transfer of a work piece, a series of relays, one connected to each contact, for controlling the work discharging mechanism, and means associated with each relay when energized for de-energizing those relays associated with contacts lying at one side of the contact associated with the relay which is energized.

5. An automatic gaging and sorting device comprising a gaging head having a port adapted to form with a work piece a gaging orifice the size of which depends upon the size of the work piece, means including a source of air at regulated pressure and a metering orifice for supplying air through the gaging orifice towards the work piece, a mercury column manometer connected to respond to pressure intermediate the two orifices, a plurality of contacts positioned along the range of travel of the mercury meniscus in the manometer for successive electric contact therewith in accordance with meniscus height, a work piece transfer and sorting mechanism having electrically controlled work discharging mechanism connected by a circuit with said contacts for selectively directing successive work pieces into various paths in accordance with their size, means operated electrically for isolating the manometer during transfer of a work piece and means for rendering effective only the contact which is immediately below the top of the mercury column.

References Cited in the file of this patent

UNITED STATES PATENTS

| | | |
|---|---|---|
| 1,826,527 | Schlaupitz | Oct. 6, 1931 |
| 2,019,066 | Balsiger | Oct. 29, 1935 |
| 2,312,357 | Odquist et al. | Mar. 2, 1943 |
| 2,429,891 | Neff | Oct. 28, 1947 |
| 2,580,342 | Aller et al. | Dec. 25, 1951 |
| 2,593,958 | Aller | Apr. 22, 1952 |
| 2,647,627 | Aller et al. | Aug. 4, 1953 |
| 2,651,412 | Aller | Sept. 8, 1953 |
| 2,779,140 | Saives | Jan. 29, 1957 |

FOREIGN PATENTS

| | | |
|---|---|---|
| 243,373 | Switzerland | July 15, 1946 |
| 988,692 | France | May 9, 1951 |